April 14, 1936.  W. C. JOHNSTON  2,037,136
TRACTOR WHEEL TREAD
Filed Nov. 16, 1935   2 Sheets-Sheet 1
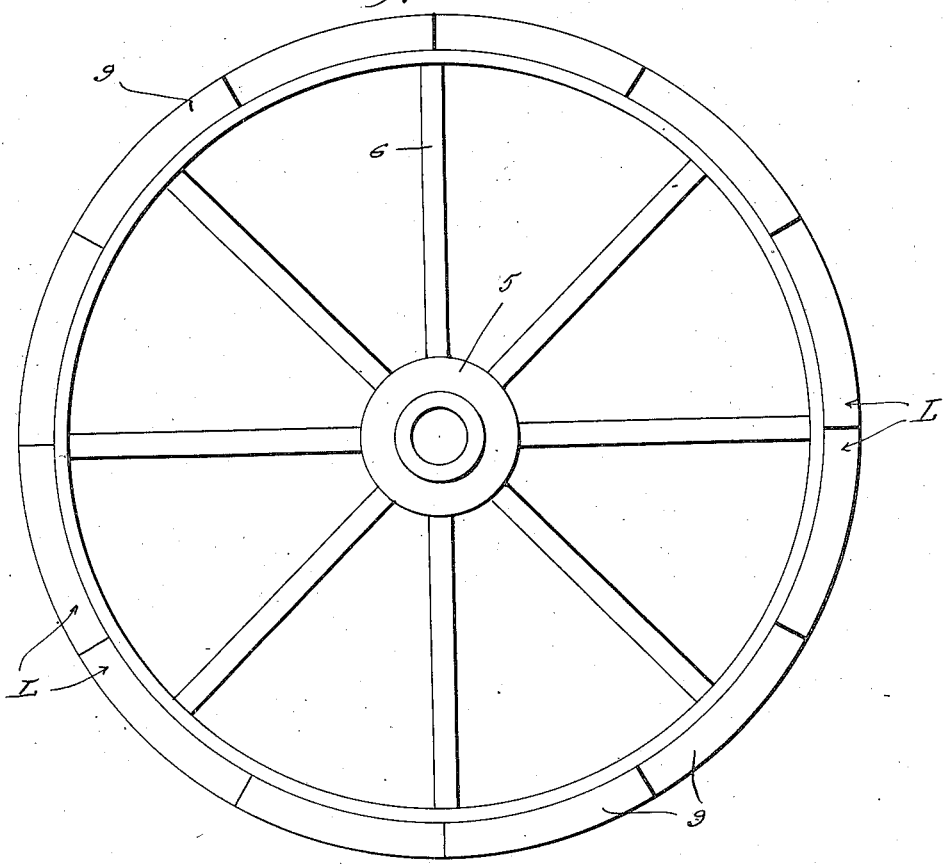
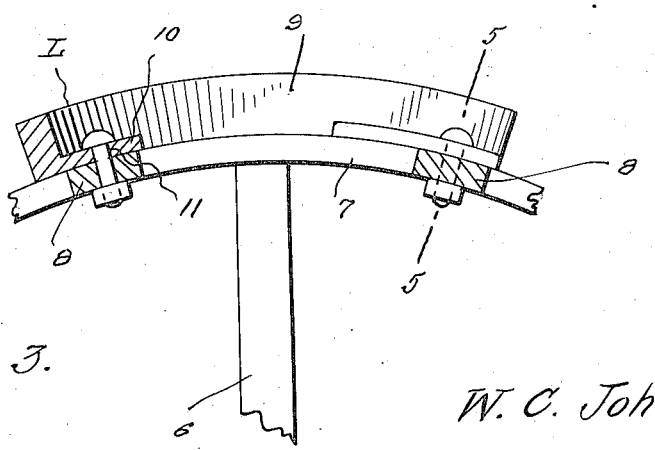
Inventor
W. C. Johnston
By Clarence A. O'Brien and
Hyman Berman
Attorneys April 14, 1936. W. C. JOHNSTON 2,037,136
TRACTOR WHEEL TREAD
Filed Nov. 16, 1935 2 Sheets-Sheet 2

Inventor
W. C. Johnston
By Clarence A. O'Brien and
Hyman Berman
Attorneys

Patented Apr. 14, 1936

2,037,136

UNITED STATES PATENT OFFICE 2,037,136

TRACTOR WHEEL TREAD

William C. Johnston, Lincoln, Nebr.

Application November 16, 1935, Serial No. 50,204

1 Claim. (Cl. 301—52)

The present invention relates to a tractor wheel tread and has for its prime object to provide a tractor wheel provided with treads which will be effective when operating on the soil and which when operating on a road bed surface will not cause bumping or uneven movement of the tractor and will not tend to cause destruction to the road-bed.

Another very important object of the invention resides in the provision of a tractor wheel having a tread which is comparatively simple in its construction, inexpensive to manufacture and install, thoroughly efficient and reliable in use, and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:—

Figure 1 is a side elevation of a tractor wheel embodying the features of my invention.

Figure 3 is a detail sectional view taken substantially on the line 3—3 of Figure 2.

Figure 2:
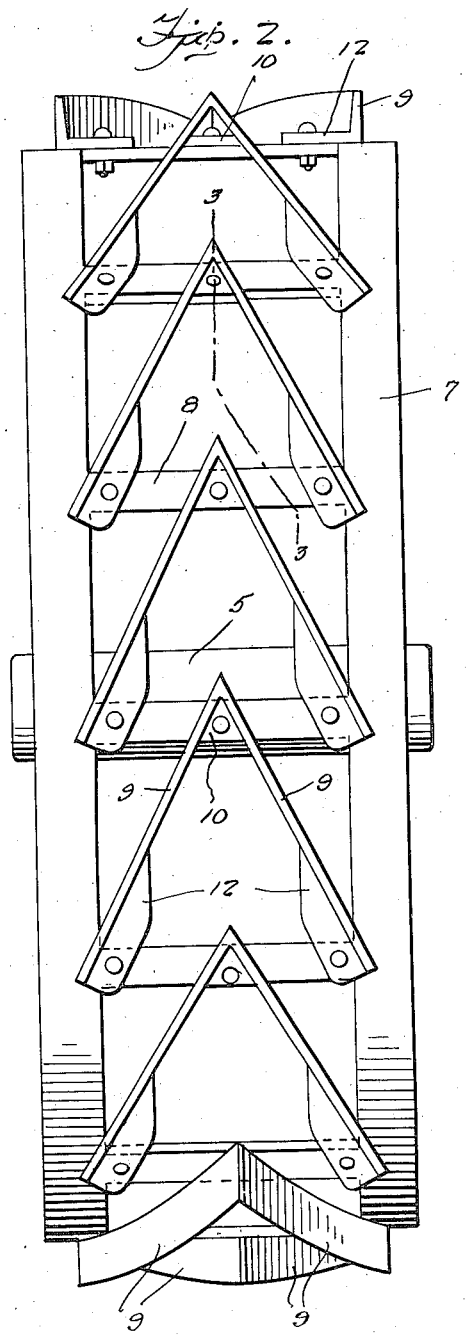
Figure 2 is an edge elevation thereof.
Figure 4:
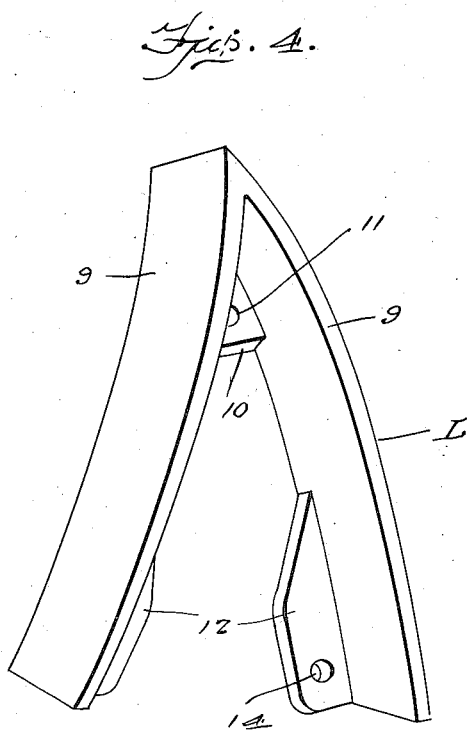
Figure 4 is a perspective view of one of the lugs.
Figure 5:
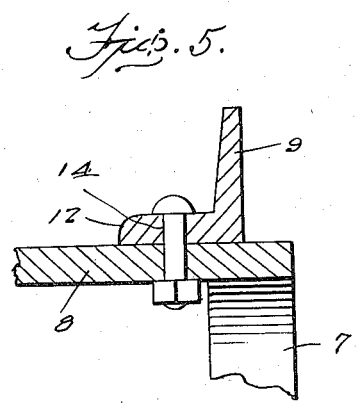
Figure 5 is a detail sectional view taken substantially on the line 5—5 of Figure 3.

Referring to the drawings in detail it will be seen that the wheel comprises a hub 5 with spokes 6 radiating therefrom in pairs and secured at their outer ends to a pair of rims 7 connected by cross members 8. These cross members are in regular spaced parallelism as is evident from an inspection of Figure 2. Thus far the tractor wheel is more or less conventional.

Referring now to the tread portion thereof it will be seen that a plurality of lugs L are utilized. Each lug is of a V-shaped formation providing two sides 9, 9, the edges of which are concentrically curved with respect to the axis of the wheel and all transverse lines of which are radial with respect to the axis of the wheel. In the apex of each lug is a web 10 having an aperture 11 and on the ends of each side are inwardly directed flanges 12 having apertures 14. The webs 14 are secured to the cross members 6 while the webs 10 are also secured thereto, rivets being used to extend through the openings 11 and 14. It is to be noted that the apex of one lug extends into the wider portion of the next adjacent lug. In this connection particular attention is directed to Figure 2. In this way it will be seen that the tread is effective on the soil but when used on a roadway does not tend to dig up the roadway or cause a humpy bumpy riding of the tractor.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

What is claimed is:—

A tractor wheel including in combination a tread portion consisting of a pair of laterally spaced cylindrical bands and circumferentially spaced cross members extending between the bands, said cross members at their respective opposite ends being integral with said bands and lying substantially flush with the outer peripheries of said bands, and a plurality of traction lugs arranged circumferentially around the tread portion, each lug being of V-shaped formation and comprising a pair of sides diverging from the apex of the V, an integral web extending across the apex portion of each V-shaped lug and secured to one of the cross members of the tread portion of the wheel, and short flanges extending inwardly from the sides of the lug at the open end of the V, said flanges having portions thereof resting on and extending diagonally of said bands and a cross member and fixedly secured to the cross member; each lug extending between a pair of said cross members with the apex of one lug extending into the wider portion of a second lug.

WILLIAM C. JOHNSTON.